United States Patent
Goldman et al.

(10) Patent No.: US 9,781,503 B2
(45) Date of Patent: Oct. 3, 2017

(54) METHOD OF OPERATING A COMPUTER AND COMPUTER FOR A SOFTPHONE WITH HEADSET

(71) Applicant: GN Netcom A/S, Ballerup (DK)

(72) Inventors: Tomasz Goldman, Ballerup (DK); Stefan Heise, Ballerup (DK)

(73) Assignee: GN NETCOM A/S (DK)

( * ) Notice: Subject to any disclaimer, the term of this patent is extended or adjusted under 35 U.S.C. 154(b) by 12 days.

(21) Appl. No.: 14/982,361

(22) Filed: Dec. 29, 2015

(65) Prior Publication Data
US 2016/0192056 A1    Jun. 30, 2016

(30) Foreign Application Priority Data
Dec. 30, 2014 (EP) ..................... 14200685

(51) Int. Cl.
  *H04R 1/10* (2006.01)
  *G06F 3/16* (2006.01)
  *H04R 27/00* (2006.01)

(52) U.S. Cl.
  CPC ......... *H04R 1/1041* (2013.01); *G06F 3/162* (2013.01); *G06F 3/165* (2013.01); *H04R 27/00* (2013.01); *H04R 2201/107* (2013.01)

(58) Field of Classification Search
  CPC ....... G06F 3/165; G06F 3/162; H04R 1/1041; H04R 3/12
  See application file for complete search history.

(56) References Cited

U.S. PATENT DOCUMENTS

| | | | | |
|---|---|---|---|---|
| 2007/0087686 A1* | 4/2007 | Holm | ................. | H04S 7/30 455/3.06 |
| 2010/0159830 A1* | 6/2010 | Findlay | ............... | H04M 1/6066 455/41.2 |

FOREIGN PATENT DOCUMENTS

EP    2544096    1/2013

OTHER PUBLICATIONS

European Search Report dated Jul. 7, 2015 for European patent application No. 14200685.7.
(Continued)

*Primary Examiner* — Muhammad N Edun
(74) *Attorney, Agent, or Firm* — Altera Law Group, LLC

(57) ABSTRACT

A computer controller for a plurality of audio devices and audio applications and a method of control is disclosed. An audio subsystem is disclosed allowing multiple applications executed by the computer to exchange audio signals with multiple sound interface devices. A first sound interface device to emit a first loudspeaker sound signal in dependence on the first loudspeaker audio signal. The sound signal is received by an intermediate application and from the audio subsystem a first microphone audio signal depending on a first microphone sound signal received by the first sound interface device. An intermediate application causes a second sound interface device to emit a second loudspeaker sound signal in dependence on the second loudspeaker audio signal. This allows a user to conduct a softphone call using one headset connected to the computer, while the user's supervisor may listen in on the softphone call using a second headset connected to the same computer, however, without requiring any changes of the computer's hardware, its operating system or the softphone application.

12 Claims, 10 Drawing Sheets

(56) References Cited

OTHER PUBLICATIONS

Graham English: "Recording with Multiple Audio Interfaces in Logic Pro X—For Dummies", Logic Pro X For Dummies, Jul. 17, 2014, XP055196798.

Anonymous: "How can I create an Aggregate Device? Knowledge Base—Support", Native Instruments, Nov. 27, 2014, XP055196653.

* cited by examiner

METHOD OF OPERATING A COMPUTER AND COMPUTER FOR A SOFTPHONE WITH HEADSET

TECHNICAL FIELD

The present invention relates to a method of operating a computer and to a computer, and a method and apparatus of controlling an audio interface between audio systems, including a headset, base station, speakerphone, a softphone and similar hardware. The method and the computer may advantageously be used e.g. during phone calls with remote parties through a softphone application communicating through a headset being executed by the computer.

BACKGROUND ART

Most operating systems for personal computers and other general-purpose computers allow software applications to access internal and external sound devices through an audio subsystem. Typically, the operating systems and/or the applications are implemented such that a user can select one audio input device and one audio output device among multiple sound devices connected to the computer, e.g. through respective USB connections. While such implementations make it very easy for a user to interact with the applications, they also restrict the use of the applications and may e.g. hinder two persons from simultaneously listening with each their headset to the same music played from the computer.

Patent application EP 2 544 096 A1 discloses an apparatus that can connect a USB host in a computer with two or more USB devices, such as headsets or other audio devices. The apparatus may comprise a splitter that splits an audio signal received from the USB host into two or more audio signals and provides the latter to the respective audio devices. It may further comprise a mixer that mixes two or more audio signals received from respective audio devices and provides the mixed signal to the USB host. Since the apparatus comprises hardware, production costs are invoked, and the versatility of the apparatus is furthermore limited by design.

A so-called "virtual audio cable" (VAC) known from the prior art allows splitting and/or mixing audio signals by means of software only, such that the extra hardware cost can be avoided. Although the known VAC is more versatile than the hardware solution, there are still use cases involving multiple audio devices that the prior art cannot support.

DISCLOSURE OF INVENTION

It is an object of the present invention to provide a method for operating a computer that may allow a more versatile use of audio devices with audio applications being executed by the computer. It is a further object of the present invention to provide a computer that may allow a more versatile use of audio devices with audio applications being executed by the computer.

These and other objects of the invention are achieved by the invention defined in the independent claims and further explained in the following description. Further objects of the invention are achieved by embodiments defined in the dependent claims and in the detailed description of the invention.

Within this document, the term "sound interface" refers to an interface suitable for transmitting a sound signal to a user in dependence on an audio output signal and/or for providing an audio input signal in dependence on a voice sound received from a user. The term "sound interface device" refers to an audio device that comprises or provides a sound interface. A sound interface device thus comprises a sound transmitter and/or a sound receiver. A "sound output device" is a sound interface device that comprises one or more sound transmitters, and a "sound input device" is a sound interface device that comprises one or more sound receivers. A sound transmitter preferably comprises one or more sound output transducers for providing the sound signal in dependence on the audio output signal. A sound receiver preferably comprises one or more sound input transducers for providing the audio input signal in dependence on the received voice sound. Examples of known sound output transducers include loudspeakers and vibrators, e.g. based on electrodynamic, electromagnetic, electrostatic, piezoelectric and/or thermoelectric principles. Examples of known sound input transducers include microphones and vibration sensors, e.g. based on electrodynamic, electromagnetic, electrostatic, piezoelectric, thermoelectric and/or optical principles. Examples of sound interface devices include handsets, headsets, headphones, earphones, loudspeakers, microphones and speakerphones.

Furthermore, when an element or entity is referred to as being "connected" or "coupled" to another element or entity, this includes direct connection (or coupling) as well as connection (or coupling) via intervening elements or entities, unless expressly stated otherwise. Also, unless expressly stated otherwise, when a signal is referred to as being "provided" or "conveyed" by a first entity to a second entity, this includes directly or indirectly transmitting the signal in its original form as well as any direct or indirect transmission that modifies the original signal and/or converts the signal into another domain and/or representation before it arrives at the second entity, provided that the information comprised by the signal received by the second entity is sufficient for the second entity to perform the specified actions with respect to the received signal.

Within this document, the singular forms "a", "an", and "the" are intended to include the plural forms as well (i.e. to have the meaning "at least one"), unless expressly stated otherwise.

Correspondingly, the terms "has", "includes", "comprises", "having", "including" and "comprising" specify the presence of respective features, operations, elements and/or components, but do not preclude the presence or addition of further entities. The term "and/or" generally includes any and all combinations of one or more of the associated items. The steps or operations of any method disclosed herein need not be performed in the exact order disclosed, unless expressly stated so.

BRIEF DESCRIPTION OF THE DRAWINGS

The invention will be explained in more detail below in connection with preferred embodiments and with reference to the drawings in which.

The figures are schematic and simplified for clarity, and they just show details essential to understanding the invention, while other details may be left out. Where practical, like reference numerals and/or names are used for identical or corresponding parts.

MODE(S) FOR CARRYING OUT THE DISCLOSURE

Figure 1:
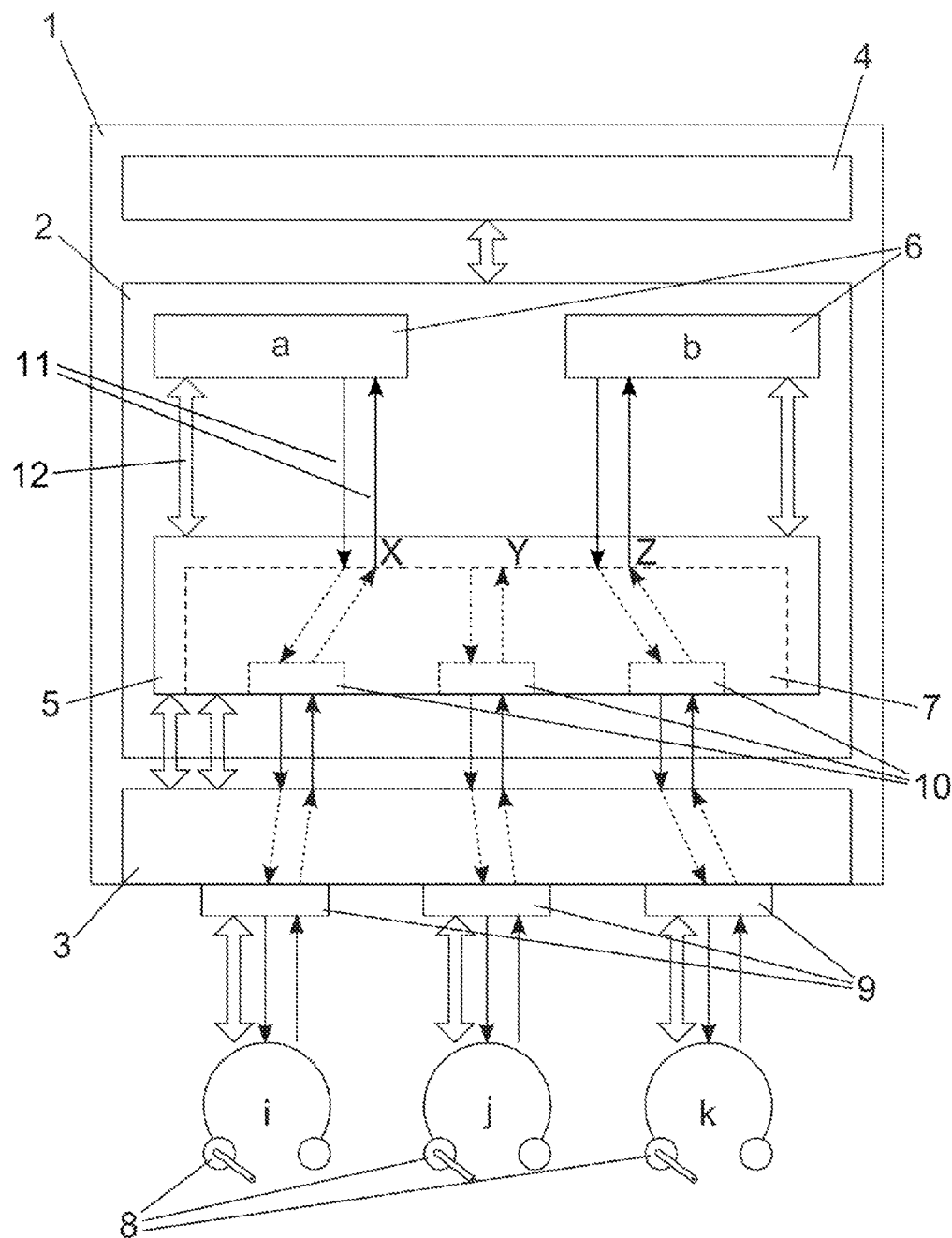
FIG. 1 shows a computer that may be operated by a method according to the invention.

The computer 1 shown in FIG. 1 comprises a processor 2, a device controller 3 and a memory 4. The memory 4 stores instructions for causing the processor 2 to execute an operating system 5 and one or more applications 6. The operating system 5 controls the computer 1 and provides an Application Program Interface (API) so that the applications 6 in a standardized way can access resources of the computer 1 and devices connected to the computer 1 through the operating system 5 and the device controller 3. The operating system 5 comprises an audio subsystem 7 that allows the applications 6 to communicate with multiple audio devices, such as the three headsets 8 shown connected to the computer 1. The headsets 8 shown represent various types of sound interface devices that may be used for voice communication with/through the computer 1. The interface between the audio subsystem 7 and the applications 6 is comprised by the API and allows the applications 6 to transmit and receive audio signals to/from the headsets 8 and/or other sound interface devices. The API further allows the applications 6 to exchange messages, commands and other data with other types of devices, such as e.g. storage devices, displays, keyboards, mice, etc. (not shown).

Each sound interface device 8 is connected to the device controller 3 through a respective connector 9 that may be wired or wireless, e.g. by means of an optical connection or an RF connection, such as e.g. a Bluetooth connection or a DECT connection. The device controller 3 is controlled by the operating system 5 through one or more device drivers 10 that handle device-specific signaling, data conversion etc. on a logical level. The device controller 3 may e.g. comprise a USB host, and one or more of the connectors 9 may comprise a USB connector. Correspondingly, one or more of the sound interface devices 8 may each comprise a USB device that "enumerates" (registers) with the USB host as a USB device capable of providing and/or receiving one or more audio signals, e.g. by registering a USB interface of the class "audio". Further details about USB may be found in the specification of the Universal Serial Bus (USB) standard.

The memory 4 may preferably comprise a non-volatile memory, such as e.g. an RAM with battery back-up, an ROM, a flash memory, a magnetic disk, an optical disk or the like, such that the operating system 5 and one or more applications 6 can be installed on the computer 1 by writing corresponding execution instructions to the memory 4. Usable types of such memories 4 are readily known in the art of computing. Alternatively, the memory 4 may be volatile and the execution instructions may be loaded from another storage medium (not shown), e.g. on start-up of the computer 1. The computer 1 may further comprise a working memory (not shown) into/from which at least some of the execution instructions are loaded and/or retrieved by the processor 2 when required.

Note that in the drawings herein, narrow arrows, such as the two arrows 11, indicate one-way audio connections, while broad arrows, such as the arrow 12, indicate one- or two-way data connections primarily used for other kinds of signals, such as e.g. control signals for controlling e.g. the device controller 3, the memory 4, applications 6, audio devices 8, etc.

The API provides a number of logic audio devices X, Y, Z to the applications 6. Each of the logic audio devices X, Y, Z may represent a physical audio device 8. Each application 6 allows a user to select among the available logic audio devices X, Y, Z—and thus among the represented audio devices 8—respectively one device for audio input and one device for audio output. Typically, each application 6 presents a list of available logic audio devices X, Y, Z—typically labelled to allow the user to infer the represented physical audio devices 8, so that the user can select the logic audio device(s) X, Y, Z, and thus the respective audio device(s) 8, that the user prefers to use with the particular application 6. The application 6 signals the user's choice to the operating system 5 which then conveys audio signals between the application 6 and the physical audio device 8 represented by the respective logic audio device X, Y, Z. In FIG. 1, the application 6a is connected to the logic audio device X and will thus exchange audio signals with the sound interface device 8i, while the application 6b is connected to the logic audio device Z and will thus exchange audio signals with the sound interface device 8k.

The above described concepts are well known in the prior art and are implemented in multiple prior art computers and operating systems for computers. The computers mentioned herein are general-purpose computers, meaning that the computers can be used for many different purposes and allow a user to install and execute various applications in order to support those different purposes. Examples of such computers comprise personal computers, desktop computers, tablet computers, laptop computers, smartphones etc.

Figure 2:
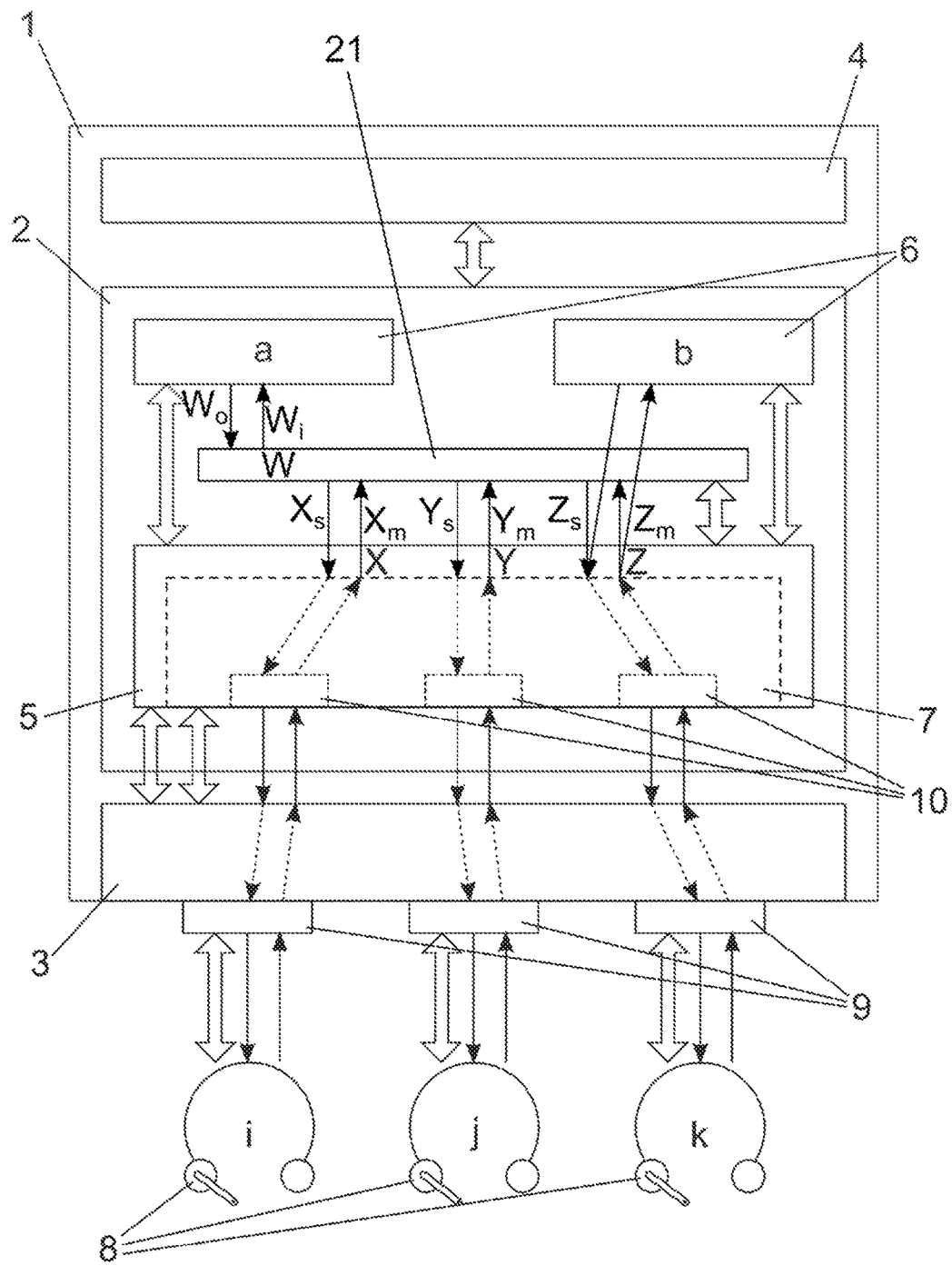
FIG. 2 illustrates a first embodiment of a computer according to the invention.

In the first embodiment of a computer 1 according to the invention shown in FIG. 2, the memory 4 may preferably further store instructions for causing the processor 2 to execute an intermediate application comprising a virtual crossbar switch 21. In the present context, an "intermediate application" is an application that conveys and processes one or more signals between one or more other applications 6 and the operating system 5 in order to extend or modify one or more functions of the operating system 5. The virtual crossbar switch 21 can receive audio signals from one or more applications 6 and/or from the operating system 5 and can be configured to combine the received audio signals in various ways and to provide the combined signals to one or more applications 6 and/or to the operating system 5. In the embodiment shown in FIG. 2, the virtual crossbar switch 21 provides a further logic audio device W to the other applications 6 and is further connectable to any or all of the logic audio devices X, Y, Z provided by the audio subsystem 7. In the following, any logic audio device W directly or indirectly provided by the virtual crossbar switch 21 are referred to as "secondary" logic audio devices, while all other logic audio devices X, Y, Z are referred to as "primary" logic audio devices. The virtual crossbar switch 21 may thus receive as crossbar inputs an audio output signal $W_o$ from one or more applications 6 and/or respective microphone audio signals $X_m, Y_m, Z_m$ from one or more of the primary logic audio devices X, Y, Z. Depending on its internal configuration, the virtual crossbar switch 21 may provide as crossbar outputs an audio input signal $W_i$ to one or more of the applications 6 and/or respective loudspeaker audio signals $X_s$, $Y_s$, $Z_s$ to one or more of the primary logic audio devices X, Y, Z, where each of the crossbar outputs $W_i$, $X_s$, $Y_s$, $Z_s$ may comprise an arbitrary combination of any number of the crossbar inputs $W_o$, $X_m$, $Y_m$, $Z_m$.

Depending on its internal configuration, the virtual crossbar switch 21 may thus at least indirectly connect the secondary logic audio device W to any number of real audio devices 8. Thus, the virtual crossbar switch 21 may itself be regarded as a virtual audio device having one or more audio inputs and/or audio outputs, and the secondary logic audio device W may be regarded as representing the virtual audio device provided by the virtual crossbar switch 21. Thus, for any application 6, the user can select the virtual crossbar switch 21 as a preferred (virtual) audio device for audio input and/or output in the same way as selecting one of the physical audio devices 8. As an example hereof, the application 6a is shown connected to the secondary logic audio device W, while the application 6b is shown connected to the same primary logic audio device Z as shown in FIG. 1. As will be explained further in the following, the concept of providing a virtual crossbar switch 21 represented by a secondary logic audio device W makes it possible to provide the user with an easy understandable and easy manageable way of controlling the use of multiple sound interface devices 8 with one or more audio applications 6. The secondary logic audio device W may preferably provide a label, such that an application 6 and/or the user can recognize the secondary logic audio device W or its function when selecting preferred logic audio devices W, X, Y, Z for audio input and/or audio output with an application 6.

In some embodiments, the virtual crossbar switch 21 may provide multiple secondary logic audio devices W, each representing an individual virtual audio device with a respective set of audio inputs and/or audio outputs. Correspondingly, the multiple secondary logic audio devices W may preferably be individually labelled. A user may, for instance, want to use a headset 8i as sound interface device for a softphone application 6a and a speakerphone 8k for playing music streamed from a music application 6b. The user may thus configure the virtual crossbar switch 21 to connect a first primary logic audio device X representing the headset 8i to a first secondary logic audio device W and to connect a second primary logic audio device Z representing the speakerphone 8k to a second secondary logic audio device (not shown). In this case, the label for the first secondary logic audio device W may preferably comprise the word "phone" or the like, while the label for the second secondary logic audio device preferably comprises the word "music", such that the user can easily distinguish the secondary logic audio devices W from each other when selecting preferred logic audio devices W, X, Y, Z for the respective applications 6a, 6b.

Figure 3:
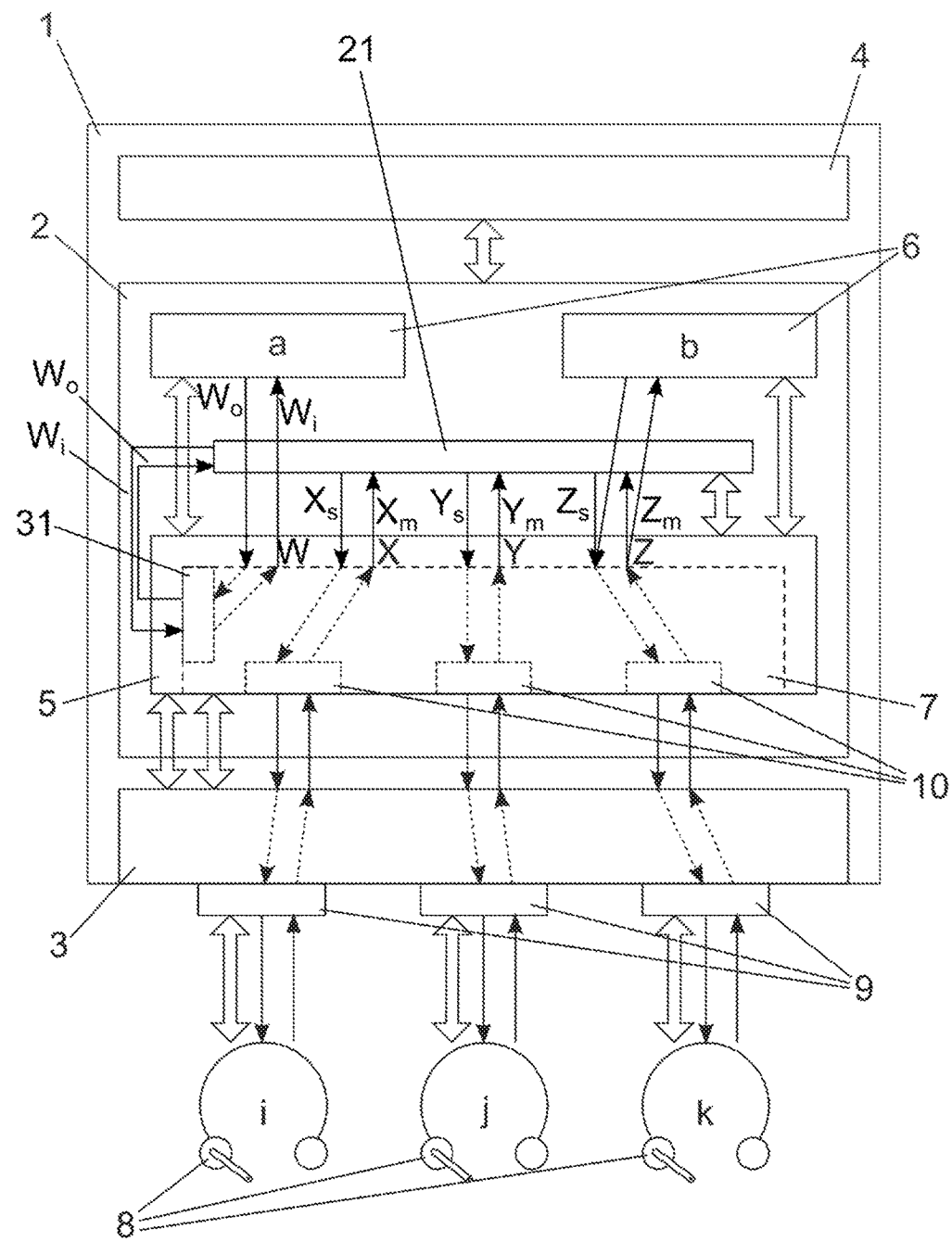
FIG. 3 illustrates a second embodiment of a computer according to the invention.

FIG. 3 illustrates a second, similar embodiment, wherein the virtual crossbar switch 21, instead of directly providing the secondary logic audio device W, connects as a virtual audio device to a further device driver 31 of the audio subsystem 7, thereby causing the operating system 5 to provide the secondary logic audio device W. In this embodiment, the virtual crossbar switch 21 exchanges the audio output signal $W_o$ and the audio input signal $W_i$ with one or more applications 6 indirectly through the audio subsystem 7. Also in this embodiment, the virtual crossbar switch 21 may provide multiple secondary logic audio devices W by connecting as multiple virtual audio devices to respective further device drivers 31 of the audio subsystem 7. While any of the first and second embodiments of a computer 1 may be comprised by various further embodiments of computers 1 according to the invention and further may be employed by various embodiments of methods according to the invention, the choice of embodiment in a specific implementation may be made depending on properties of the particular operating system 5 in use, for instance depending on whether or not the operating system 5 allows an intermediate application 21 to connect as a virtual audio device to the audio subsystem 7. The second embodiment may in some instances allow a seamless integration of the virtual crossbar switch 21 with the operating system 5 and the applications 6, such that the computer 1 can operate as described above without requiring changes to the operating system 5 or the applications 6, although, however, that with some operating systems 5 it may be required to provide and install the further device driver 31 as a custom device driver.

Figure 4:
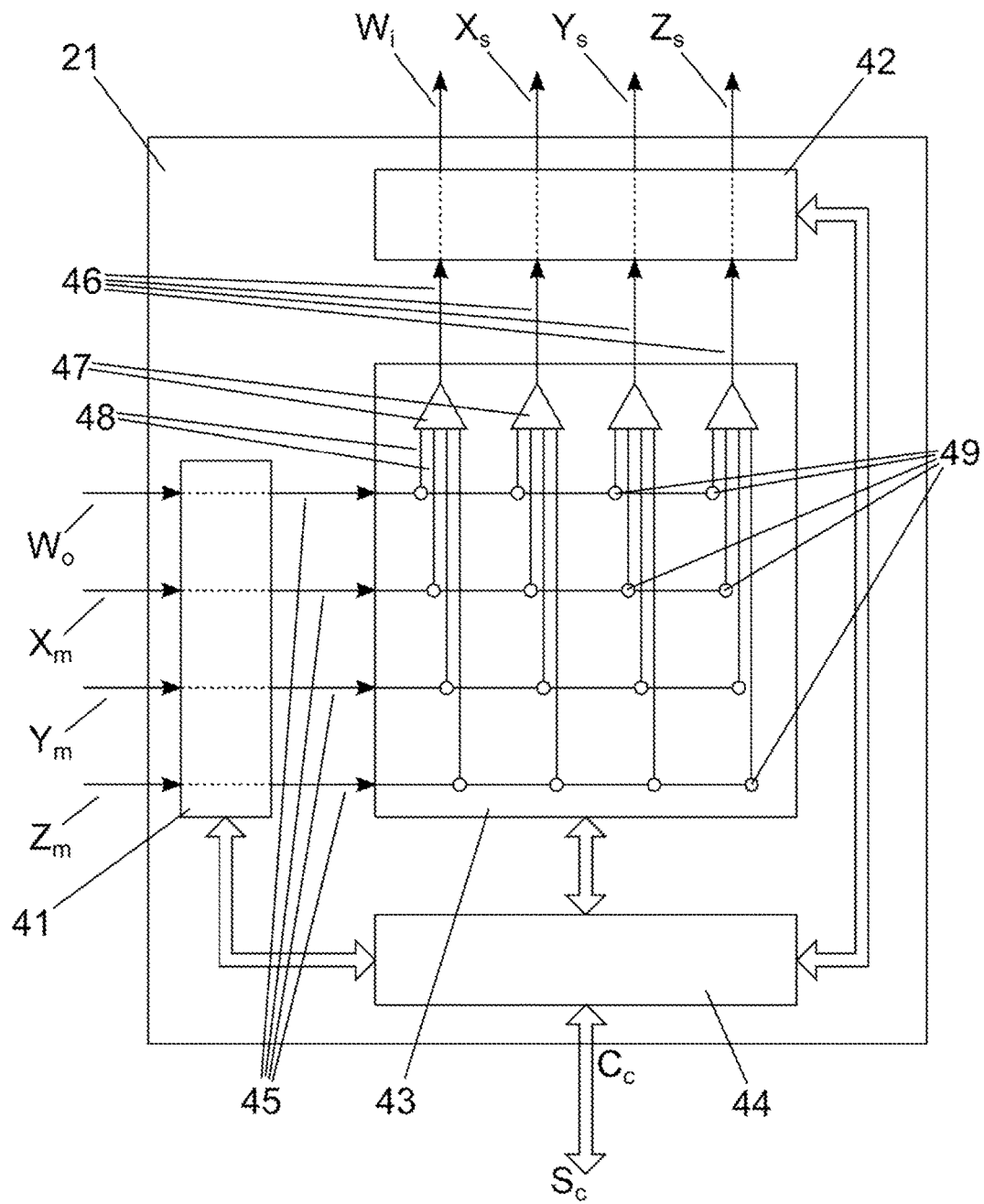
FIG. 4 illustrates an example of a virtual crossbar switch comprised by embodiments of the invention.

FIG. 4 illustrates an example virtual crossbar switch 21 that may be comprised by various embodiments of computers 1 according to the invention, such as e.g. the first or the second embodiment described above, and that may further be employed by various embodiments of methods according to the invention. The virtual crossbar switch 21 comprises a pre-processor 41, a post-processor 42, a switch matrix 43 and a crossbar controller 44.

The pre-processor 41 conveys the crossbar inputs $W_o$, $X_m$, $Y_m$, $Z_m$ received by the virtual crossbar switch 21 to respective matrix inputs 45 of the switch matrix 43. The pre-processor 41 may preferably pre-process the crossbar inputs $W_o$, $X_m$, $Y_m$, $Z_m$ and provide the pre-processed crossbar inputs to the matrix inputs 45. The post-processor 42 provides the crossbar outputs $W_i$, $X_s$, $Y_s$, $Z_s$ by conveying respective audio signals from matrix outputs 46 of the switch matrix 43. The post-processor 42 may preferably post-process the audio signals from the matrix outputs 46 and provide the post-processed audio signals as the crossbar outputs $W_i$, $X_s$, $Y_s$, $Z_s$. The pre- and/or post-processing may comprise any combination of any known audio signal processing, such as e.g. normalization of signal levels, frequency filtering, noise reduction as well as cancellation or reduction of echoes and reverberation, etc. In some embodiments, the pre-processor 41 and the post-processor 42 may communicate with each other in order to improve such pre- and/or post-processing. In some embodiments, the pre-processor 41 and/or the post-processor 42 may provide a software interface that allows the installation of plug-ins that execute at least at portion of the pre- and/or post-processing.

The switch matrix 43 may for each crossbar output $W_i$, $X_s$, $Y_s$, $Z_s$ comprise an adder 47 with an input 48 for each crossbar input $W_o$, $X_m$, $Y_m$, $Z_m$. The switch matrix 43 may further comprise for each adder input 48 a controllable switch 49 that allows connecting and disconnecting the respective adder input 48 to/from the respective crossbar input $W_o$, $X_m$, $Y_m$, $Z_m$. In some embodiments, one or more of the controllable switches 49 may each be replaced or augmented by a controllable attenuator or amplifier (not shown), such that the crossbar inputs $W_o$, $X_m$, $Y_m$, $Z_m$ can be faded in and out when connecting and disconnecting the respective adder input 48.

Figure 5:
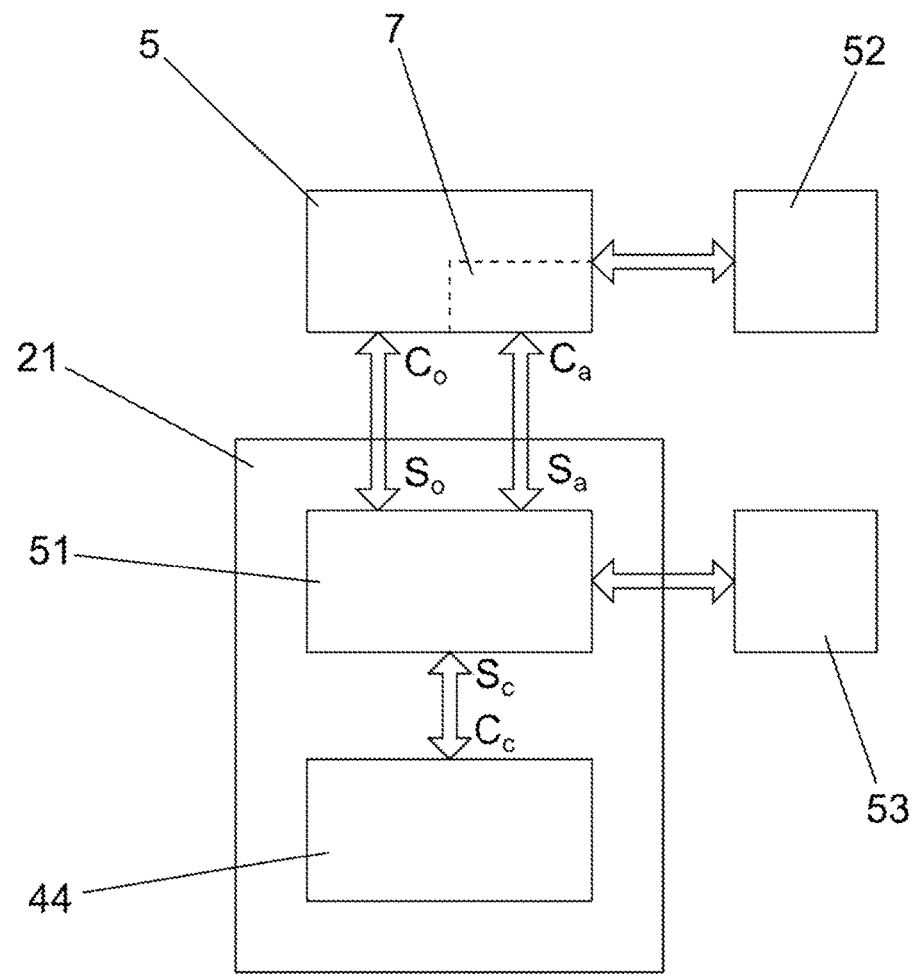
FIG. 5 illustrates further details of the virtual crossbar switch of FIG. 4.

The crossbar controller 44 controls the pre-processor 41, the post-processor 42 and/or the switch matrix 43, preferably in dependence on a crossbar control signal $C_c$ received from a configuration controller 51 (see FIG. 5). Such controlling may comprise e.g. determining one or more pre- and/or post-processing algorithms and/or one or more parameters therefor, determining and/or invoking one or more pre- and/or post-processing plugins, controlling one or more adders 47, making and/or breaking one or more controllable switches 49 as well as controlling one or more controllable attenuators and/or one or more controllable amplifiers to obtain a function indicated in the crossbar control signal $C_c$. The crossbar controller 44 may preferably further provide to the configuration controller 51 a crossbar status signal $S_c$ indicating a status of the pre-processor 41, a status of the post-processor 42 and/or a status of the switch matrix 43. Such status may e.g. comprise indications of whether or not the respective functional block 41, 42, 43 is active and/or receives one or more signals as well as levels of received and/or provided signals etc.

As shown in FIG. 5, the virtual crossbar switch 21 may further comprise a configuration controller 51 that controls the crossbar controller 44 through the crossbar control signal $C_c$ in dependence on one or more computer status signals $S_o$, $S_a$ received respectively from the operating system 5 and/or the audio subsystem 7. The configuration controller 51 may preferably monitor the one or more computer status signals $S_o$, $S_a$ to determine which sound interface devices 8 and/or other audio devices are currently connected to the computer 1, to detect changes hereof, and/or to detect user actions, such as manipulations of a user interface 52 of the computer 1 and/or of control elements of the sound interface devices 8. The configuration controller 51 may communicate with a configuration storage 53 of the computer 1 as described further below.

The configuration controller 51 may further provide respective computer control signals $C_o$, $C_a$ to the operating system 5 and/or the audio subsystem 7 in dependence on the crossbar status signal $S_c$ received from the crossbar controller 44 and/or on the one or more computer status signals $S_o$, $S_a$. The configuration controller 51 may provide commands in the computer control signals $C_o$, $C_a$ that may cause the operating system 5 and/or the audio subsystem 7 to e.g. connect and/or disconnect specific sound interface devices 8 and/or other audio devices, to prompt the user for a selection of preferred audio devices 8, 21 for audio input and/or output to an application 6, to prompt the user for other selections as described further below in connection with FIGS. 6-9, to alert the user of changes in the currently connected sound interface devices 8 and/or other audio devices, to provide responses to user actions, etc. The operating system 5 may provide such prompts, alerts and/or responses through the user interface 52. Alternatively, or additionally, the operating system 5 may provide such prompts, alerts and/or responses in the form of audio signals to one or more of the sound interface devices 8, thereby causing the latter to provide the prompts, alerts and/or responses as audible sound signals.

The configuration controller 51 may preferably for each of the sound interface devices 8 determine a device connection state indicating whether or not the respective sound interface device 8 is available for exchange of audio signals through the audio subsystem 7. The configuration controller 51 may further determine the device connection state for a connected sound interface device 8 in dependence on whether or not a microphone of the sound interface device 8 is muted and thus, for instance, determine that a connected sound interface device 8 with a muted microphone is unavailable for exchange of audio signals. The configuration controller 51 may preferably further determine a device type and/or a device identity for each sound interface device 8 for which the respective device connection state indicates availability for exchange of audio signals through the audio subsystem. In the following, such sound interface devices 8 are referred to as available sound interface devices 8.

The configuration controller 51 preferably determines the device connection states, the device types and/or the device identities in dependence on information in the computer status signals $S_o$, $S_a$, such as e.g. type indications or serial numbers of the sound interface devices 8. The configuration controller 51 may preferably keep a record of previously available sound interface devices 8 based on e.g. their device types and/or their device identities in order to be able to recognize such sound interface devices 8 when they become connected and/or available again. The configuration controller 51 may preferably control the internal configuration of the virtual crossbar switch 21 in dependence on the determined device connection states, device types and/or device identities, such that connecting and disconnecting adder inputs 48 to/from the crossbar inputs $W_o$, $X_m$, $Y_m$, $Z_m$ and/or the pre- or post-processing depends hereon.

Figure 6:
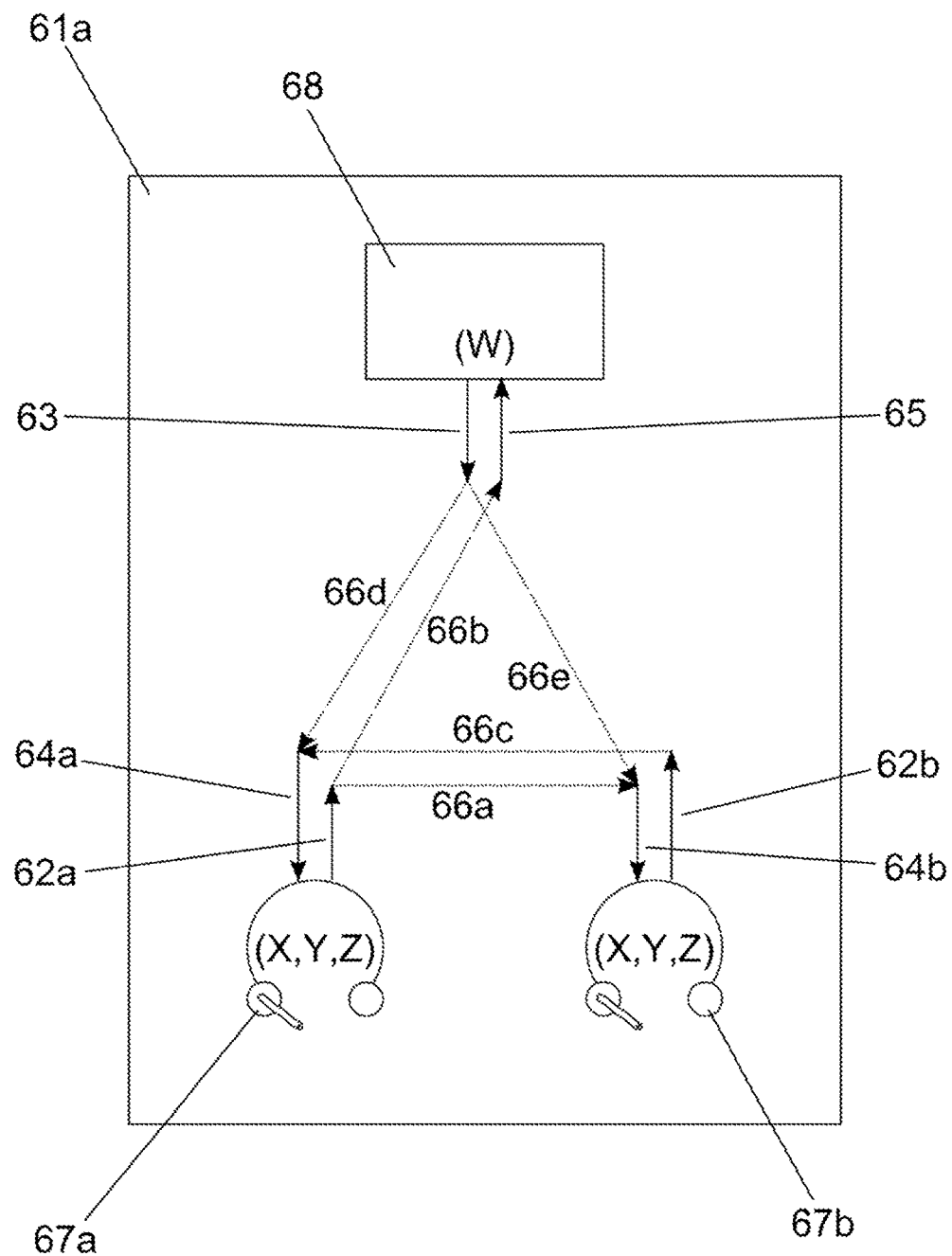
FIG. 6 shows a first example configuration template that may be used with embodiments of the invention.

The configuration controller 51 may preferably control the internal configuration of the virtual crossbar switch 21 in dependence on one or more configuration templates 61, such as the first example configuration template 61a shown in FIG. 6. Each configuration template 61 prescribes one or more audio sources 62, 63, one or more audio sinks 64, 65 and one or more audio connections 66 that each connects an audio source 62, 63 to an audio sink 64, 65. Each of the one or more audio sources 62, 63 and the one or more audio sinks 64, 65 is associated with either a device placeholder 67 or an application placeholder 68. Each device placeholder 67 represents a primary logic audio device X, Y, Z, and each application placeholder 68 represents a secondary logic audio device W with which arbitrary applications 6 can connect. Thus, each audio source 62 associated with a device placeholder 67 represents a microphone signal $X_m$, $Y_m$, $Z_m$ or other audio input signal received from the primary logic audio device X, Y, Z represented by the particular device placeholder 67, each audio source 63 associated with an application placeholder 68 represents an audio output signal $W_o$ received from an arbitrary application 6 through the secondary logic audio device W, each audio sink 64 associated with a device placeholder 67 represents a loudspeaker signal $X_s$, $Y_s$, $Z_s$ or other audio output signal provided to the primary logic audio device X, Y, Z represented by the particular device placeholder 67, and each audio sink 65 associated with an application placeholder 68 represents an audio input signal $W_i$ provided to an arbitrary application 6 through the secondary logic audio device W.

One or more of the configuration templates 61 may further prescribe pre-processing to be applied to one or more of the crossbar inputs $W_o$, $X_m$, $Y_m$, $Z_m$, and the configuration controller 51 may preferably control the pre-processor 41 in dependence on the pre-processing prescribed by one or more configuration templates 61. Similarly, one or more of the configuration templates 61 may further prescribe post-processing to be applied to one or more of the audio signals from the matrix outputs 46, and the configuration controller 51 may preferably control the post-processor 42 in dependence on the post-processing prescribed by one or more configuration templates 61. A configuration template 61 may e.g. prescribe pre- or post-processing by prescribing a particular algorithm or a particular plug-in and/or one or more parameters for an algorithm or a plug-in, and the configuration controller 51 may preferably control the pre- and post-processors 41, 42 accordingly.

Each configuration template 61 thus prescribes routing and/or processing of audio signals within the virtual crossbar switch 21 between one or more primary logic audio devices X, Y, Z and/or one or more secondary logic audio devices W. Each primary logic audio device X, Y, Z represents a sound interface device 8 or other audio device, and each configuration template 61 may preferably further prescribe a device type and/or a device identity of such audio devices 8. Each configuration template 61 may thus prescribe a corresponding sound interface configuration. In the following examples, it is assumed that the application 6a comprises a softphone and it is thus referred to as a softphone application. The term "softphone" refers to a software-based implementation for a general-purpose computer of a telephone-like function, such as e.g. the widely used software applications that make IP telephony available on personal computers, laptops, smartphones etc. Each configuration template 61 may further prescribe that one or more audio devices 8 be hidden from specific applications 6, such as e.g. communication applications 6a, as described further below in connection with FIG. 10.

The first example configuration template 61a shown in FIG. 6 prescribes audio signal routing according to a "trainee-supervisor configuration" that may preferably be used in a use case wherein a trainee (a user) is engaged in a softphone call using a headset 8i and a softphone application 6a executed by the computer 1 and wherein the trainee's supervisor is listening in on the call using a further headset 8k and shall be able to instruct the trainee verbally through the headsets 8i, 8k without being heard by remote parties to the call. To achieve this, the trainee-supervisor configuration template 61a comprises:

a first device placeholder 67a, which represents the trainee's headset 8i, with a first audio source 62a and a first audio sink 64a;

a second device placeholder 67b, which represents the supervisor's headset 8k, with a second audio source 62b and a second audio sink 64b; and an application placeholder 68, which represents the softphone application 6a (or any other application 6), with a third audio source 63 and a third audio sink 65, and further prescribes that:

the first audio source 62a is connected to the second audio sink 64b through a first audio connection 66a and to the third audio sink 65 through a second audio connection 66b;

the second audio source 62b is connected only to the first audio sink 64a through a third audio connection 66c; and the third audio source 63 is connected to the first audio sink 64a through a fourth audio connection 66d and to the second audio sink 64b through a fifth audio connection 66e.

The trainee-supervisor configuration template 61a may further prescribe that the first device placeholder 67a represents a sound interface device 8 having the device type "headset" and having a device identity identical to that of the headset 8i that the trainee usually uses for softphone calls. The trainee-supervisor configuration template 61a may further prescribe that the second device placeholder 67b represents a sound interface device 8 having the device type "headset", however without prescribing a specific device id, such that the supervisor can use any headset 8 (other than the headset 8i) for listening in. The trainee-supervisor configuration template 61a may further prescribe a label, e.g. "Trainee-supervisor setup", to be used by the secondary logic audio device W, such that an application 6 and/or the user can recognize the secondary logic audio device W or its function when selecting preferred logic audio devices W, X, Y, Z for audio input and/or audio output with an application 6.

The configuration controller 51 preferably uses the configuration templates 61 as input for determining the internal configuration of the virtual crossbar switch 21 as described in the following. Having determined the available sound interface devices 8 and, where possible and/or required, their device types and/or device identities as described further above, the configuration controller 51 determines a set of configuration templates 61 that match the available sound interface devices 8 and thereby determines a set of available sound interface configurations, i.e. a set of predefined sound interface configurations that can be realized with the currently available sound interface devices 8. The configuration controller 51 would, for instance, determine a match for the trainee-supervisor configuration template 61a when two sound interface devices 8 with the prescribed device type "headset" are determined as available and when one of these has a device id identical to the one prescribed for the first device placeholder 67. In this case, the set of available sound interface configurations would comprise a "trainee-supervisor configuration".

In response to determining a match for more than one configuration template 61, the configuration controller 51 preferably prompts the user for a selection of a desired sound interface configuration, e.g. by having the computer 1 provide or display information from the matching configuration templates 61, such as e.g. their labels, or otherwise provide to the user an indication of the set of available sound interface configurations. The configuration controller 51 may preferably receive a user response signal indicating a detected user response and select a sound interface configuration from the set of available sound interface configurations in dependence on the user response signal. The user response signal may e.g. indicate a selected configuration template 61, and the configuration controller 51 may preferably subsequently configure the virtual crossbar switch 21 to provide the audio connections and/or the pre- or post-processing prescribed by the selected configuration template 61.

In response to determining a single match, the configuration controller 51 preferably automatically configures the virtual crossbar switch 21 to provide the audio connections and/or the pre- or post-processing prescribed by the matching configuration template 61, optionally with a notification to the user. If a match was not found, the configuration controller 51 may preferably notify the user accordingly. The configuration controller 51 may preferably suspend configuring the virtual crossbar switch 21 and/or notifying the user if it detects that the secondary logic audio device W has not been selected by any application 6. In this case, the configuration controller 51 may preferably perform the suspended action when it later detects that the secondary logic audio device W becomes selected by an application 6.

By configuring the virtual crossbar switch 21 according to a matching and/or desired configuration template 61, the configuration controller 51 causes the computer 1 to provide one or more loudspeaker audio signals $X_s$, $Y_s$, $Z_s$ and/or one or more audio input signal $W_i$ in dependence on the sound interface configuration that corresponds to the particular configuration template 61.

Note that in the examples above, it is immaterial whether for instance the trainee's headset 8i is connected to the first primary logic audio device X or to any of the other primary logic audio devices Y, Z, since with many operating systems 5 it is not possible for applications 6 to distinguish between individual logic audio devices W, X, Y, Z in other ways than determining a device name, a device type and/or a device identity of the audio devices 8 they represent. In the case that the invention is implemented with an operating system 5 that provides information about e.g. which connector 9 an audio device 8 is connected to, such information may be used, i.e. be prescribed in the configuration templates 61 and be compared thereto, to distinguish between different physical sound interface devices 8 in addition to or instead of using their device identities.

Assuming that the softphone application 6a, the trainee's headset 8i and the supervisor's headset 8k are connected as shown in FIG. 2, the configuration controller 51 may thus configure the virtual crossbar switch 21 to provide the audio connections 66a-66e prescribed by the trainee-supervisor configuration template 61a and thereby achieve that the virtual crossbar switch 21:

- receives a first audio output signal $W_o$ (63) from the softphone application 6a;
- provides a first loudspeaker audio signal $X_s$ (64a) to the audio subsystem 7 in dependence (66d) on the first audio output signal $W_o$, thereby causing a first sound interface device 8i to emit a first loudspeaker sound signal in dependence on the first loudspeaker audio signal $X_s$;
- receives from the audio subsystem 7 a first microphone audio signal $X_m$ (62a) depending on a first microphone sound signal received by the first sound interface device 8i;
- provides a first audio input signal $W_i$ (65) to the softphone application 6a in dependence (66b) on the first microphone audio signal $X_m$;
- provides a second loudspeaker audio signal $Z_s$ (64b) to the audio subsystem 7 in dependence (66e) on the first audio output signal $W_o$ and the first microphone audio signal $X_m$ (66a), thereby causing a second sound interface device 8k to emit a second loudspeaker sound signal in dependence on the second loudspeaker audio signal $Z_s$;
- receives from the audio subsystem 7 a second microphone audio signal $Z_m$ (62b) depending on a second microphone sound signal received by the second sound interface device 8k; and
- provides the first loudspeaker audio signal $X_s$ in further dependence (66c) on the second microphone audio signal $Z_m$.

Reference numbers in parenthesis are added to the text above in order to allow the reader to locate the relevant audio sources 62, 63, audio sinks 64, 65 and audio connections 66 in FIG. 6. Further example configuration templates 61b-61d are shown in FIGS. 7-9 and described in the following.

Figure 7:
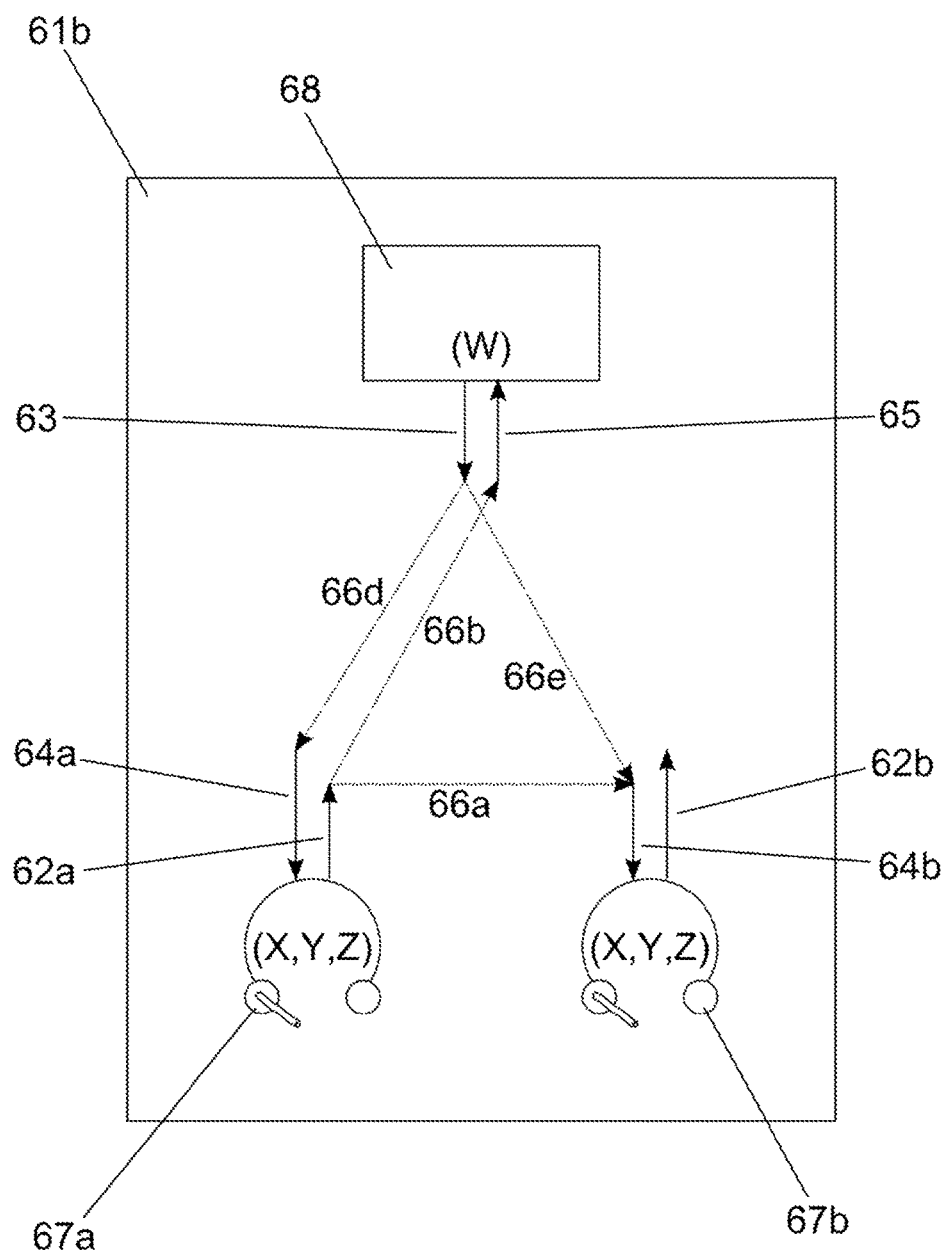
FIG. 7 shows a second example configuration template that may be used with embodiments of the invention.

The second example configuration template 61b shown in FIG. 7 is a simplification of the trainee-supervisor configuration template 61a. It prescribes audio signal routing according to an "agent-supervisor configuration" that may preferably be used in a use case wherein an agent (a user) is engaged in a softphone call using the headset 8i and the softphone application 6a executed by the computer 1 and wherein the agent's supervisor is listening in on the call using a further headset 8k, however without speaking through the headset 8i, 8k. Consequently, the third audio connection 66c is omitted in the agent-supervisor configuration template 61b. When configuring the virtual crossbar switch 21 to provide the audio connections prescribed by the agent-supervisor configuration template 61b, the configuration controller 51 may thus achieve that the virtual crossbar switch 21 functions as for the above trainee-supervisor configuration, however without receiving the second microphone audio signal $Z_m$ and without providing the first loudspeaker audio signal $X_s$ in further dependence on the second microphone audio signal $Z_m$.

Figure 8:
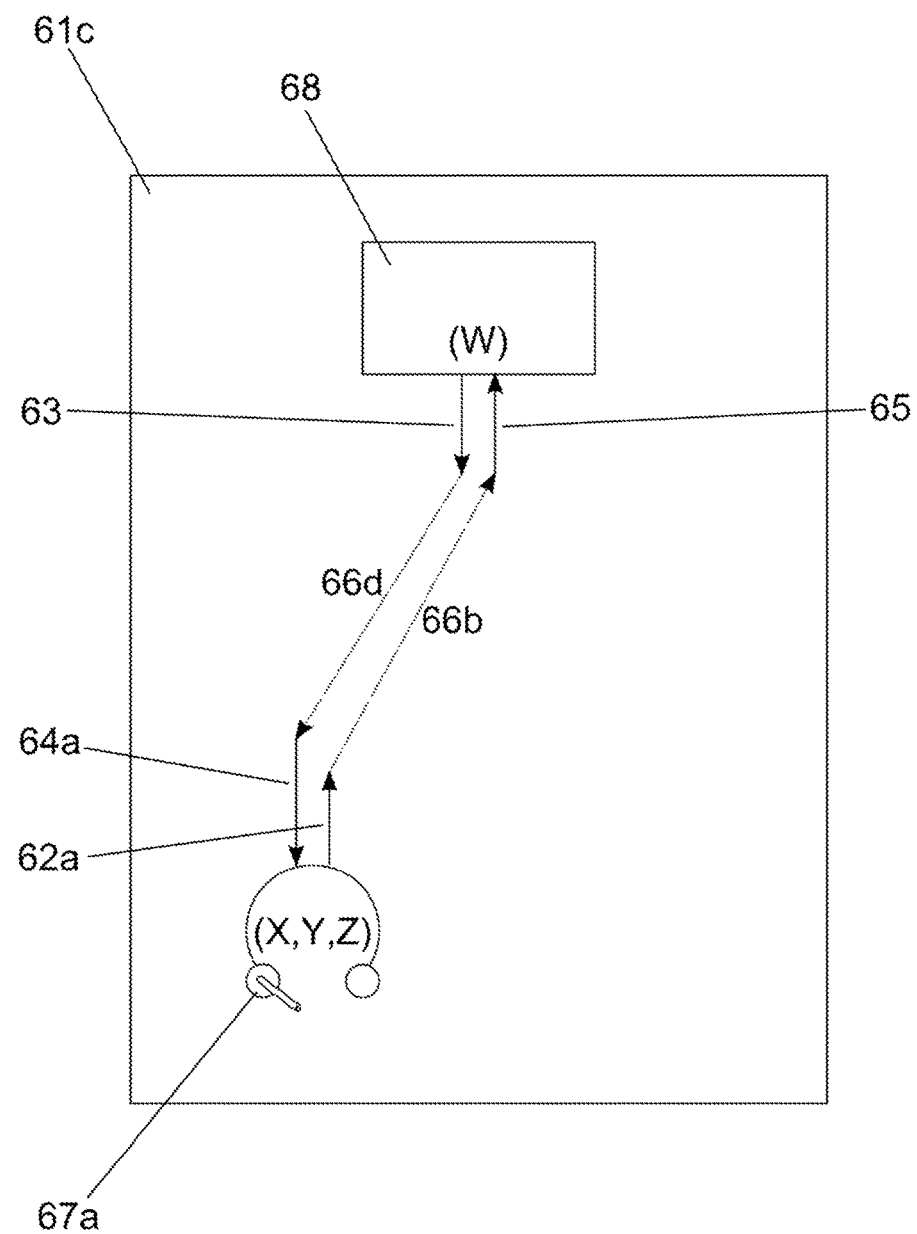
FIG. 8 shows a third example configuration template that may be used with embodiments of the invention.

The third example configuration template 61c shown in FIG. 8 is a further simplification of the agent-supervisor configuration template 61b and prescribes audio signal routing according to a "single-headset configuration" that may preferably be used in a use case wherein a user wants to use a single headset 8i as sound interface device 8 with an application 6. In the single-headset configuration template 61c, the second device placeholder 67b and any device types and/or device identities prescribed therefor are omitted as well as the first, third and fifth audio connections 66a, 66c, 66e. The configuration controller 51 may thus configure the virtual crossbar switch 21 to provide the audio connections prescribed by the single-headset configuration template 61c and thereby achieve that the virtual crossbar switch 21 functions as for the above agent-supervisor configuration, however without receiving the second microphone audio signal $Z_m$, without providing the first loudspeaker audio signal $X_s$ in further dependence on the second microphone audio signal $Z_m$ and without providing the second loudspeaker audio signal $Z_s$ at all.

Figure 9:
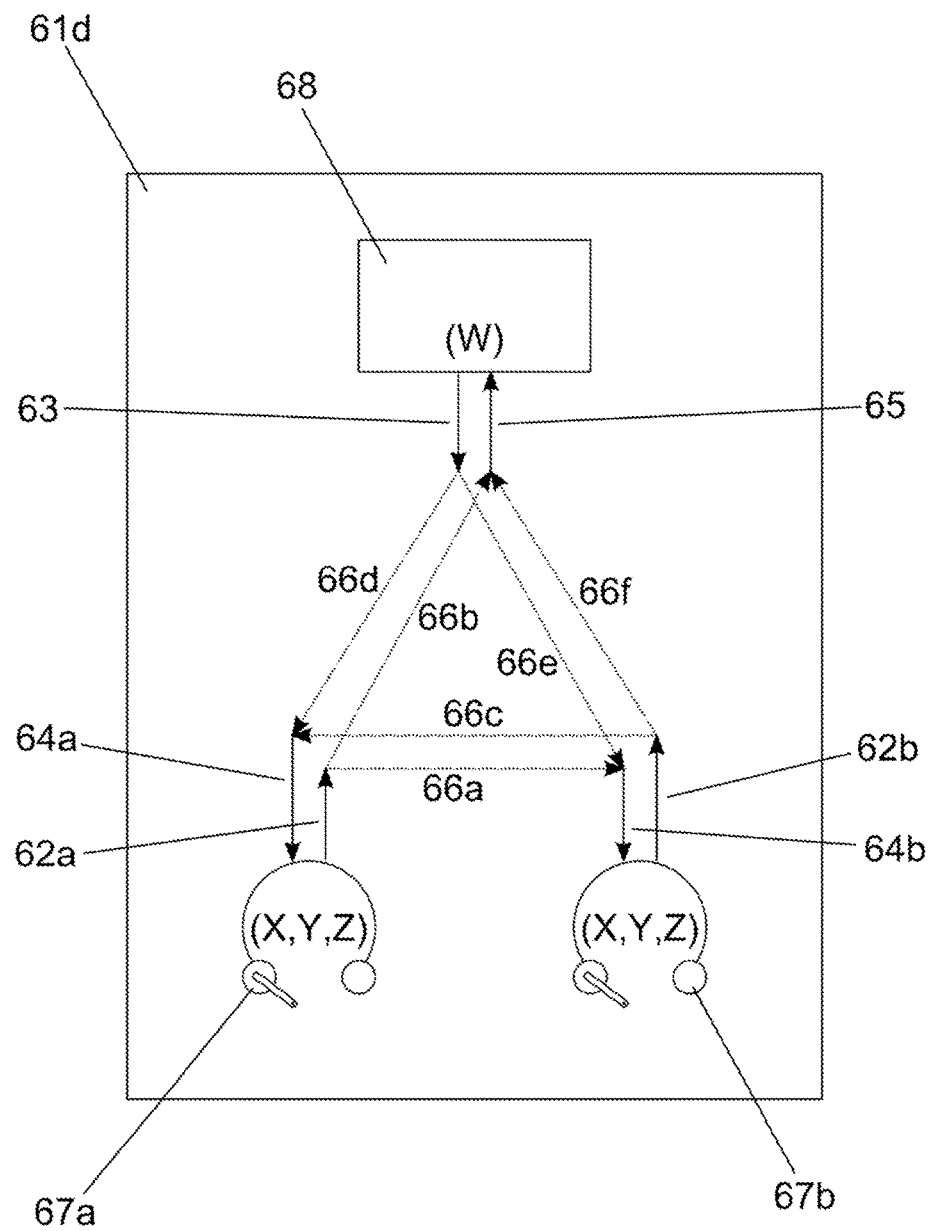
FIG. 9 shows a fourth example configuration template that may be used with embodiments of the invention.

The fourth example configuration template 61d shown in FIG. 9 is an augmentation of the trainee-supervisor configuration template 61a and prescribes audio signal routing according to a "dual-headset conferencing configuration" that may preferably be used in a use case wherein two users want to use each their headset 8i, 8k as sound interface device 8 with a softphone application 6a executed by one and the same computer 1 and wherein the two users shall be able to communicate with remote parties and with each other through theirs headsets 8i, 8k. Accordingly, the dual-headset conferencing configuration template 61d further comprises a sixth audio connection 66f connecting the second audio source 62b to the third audio sink 65, and any device identity prescribed for the second device placeholder 67b may be omitted. The configuration controller 51 may thus configure the virtual crossbar switch 21 to provide the audio connections prescribed by the dual-headset conferencing configuration template 61d and thereby achieve that the virtual crossbar switch 21 functions as for the above trainee-supervisor configuration, however with the addition of providing the first audio input signal $W_i$ to the first application 6a in further dependence on the second microphone audio signal $Z_m$ and without the restriction that the sound interface devices 8i, 8k must have specific device identities.

Further configuration templates 61 for further use cases may easily be contemplated and added by the skilled person in order to further extend the use of multiple sound interface devices 8 with audio applications 6 on the computer 1. Such further configuration templates 61 may prescribe e.g.:

- a team-education configuration for a team-education use case, wherein a local presenter using a headset 8 and a remote presenter connected through the softphone application 6a both shall be able to address a local audience through a local speakerphone 8, and wherein a microphone signal from the speakerphone 8 may or may not be sent to the remote presenter;
- a local-presenter configuration for a local-presenter use case, wherein a local presenter using a headset 8 shall be able to address a local audience through a local speakerphone 8, and wherein a microphone signal from the speakerphone 8 may or may not be sent to the headset 8;

a dual-speakerphone configuration for a dual-speakerphone use case, wherein two user groups shall be able to use each their speakerphone 8i, 8k as sound interface device 8 with an application 6 executed by one and the same computer 1; and a call-recording configuration for a call-recording use case, wherein the virtual crossbar switch 21 shall provide a further secondary logic audio device W that can be connected to e.g. a sound recording application 6b, and wherein the virtual crossbar switch 21 further shall convey the audio signals from all involved audio sources to the further secondary logic audio device W. The further secondary logic audio device W may preferably provide a label comprising the word "recorder" or the like.

The configuration controller 51 may preferably communicate with the configuration storage 53 in order to store and/or retrieve a number of predefined configuration templates 61. The configuration controller 51 may preferably repeatedly check for a match between the stored configuration templates 61 and the currently available sound interface devices 8 and/or device types and/or device identities of the available sound interface devices 8 and may thus repeatedly determine the set of available sound interface configurations. The configuration controller 51 may preferably notify the user, when the set of available sound interface configurations changes, and optionally prompt for a selection in the case that the set comprises more than one sound interface configuration. The configuration storage 53 may further store an indication of a preferred sound interface configuration, e.g. in the form of a corresponding configuration template 61 and/or a reference to an already stored configuration template 61, and the configuration controller 51 may preferably automatically select the preferred sound interface configuration whenever the set of available sound interface configurations changes into a set comprising more than one sound interface configuration of which the preferred sound interface configuration is one. The configuration storage 53 may store an indication of multiple preferred sound interface configurations together with respective relative priorities, and the configuration controller 51 may preferably automatically select the preferred sound interface configuration with the higher priority in the case that the set of available sound interface configurations comprises more than one of the preferred sound interface configurations. The configuration storage 53 may further for each of one or more preferred sound interface configurations store one or more preference conditions each defining a condition for enabling selection of the respective preferred sound interface configuration, and the configuration controller 51 may preferably disregard any preferred sound interface configuration for which at least one preference condition is not fulfilled.

The conditions defined by the preference conditions may comprise e.g.:

that the computer 1 is engaged in a softphone or phone call, that the computer 1 is not engaged in a softphone or phone call, that one or more sound interface devices 8 prescribed in a configuration template 61 representing the respective preferred sound interface configuration are engaged in a softphone or phone call, and/or that none of the sound interface devices 8 prescribed in a configuration template 61 representing the respective preferred sound interface configuration are engaged in a softphone or phone call.

The predefined configuration templates 61 may e.g. be written to the configuration storage 53 at the same occasion as the execution instructions for the intermediate application and/or for the virtual crossbar switch 21 are written to the memory 4, e.g. at the time of installing the intermediate application and/or the virtual crossbar switch 21 on the computer 1. Alternatively or additionally, the intermediate application, the virtual crossbar switch 21 and/or other software on the computer 1 may allow a user to create, delete and/or edit the predefined configuration templates 61 as well as the indications of preferred sound interface configurations and any associated priorities, so that these can be written or updated to the configuration storage 53 at a later time. The configuration storage 53 is preferably non-volatile and may e.g. be comprised by the memory 4.

Figure 10:
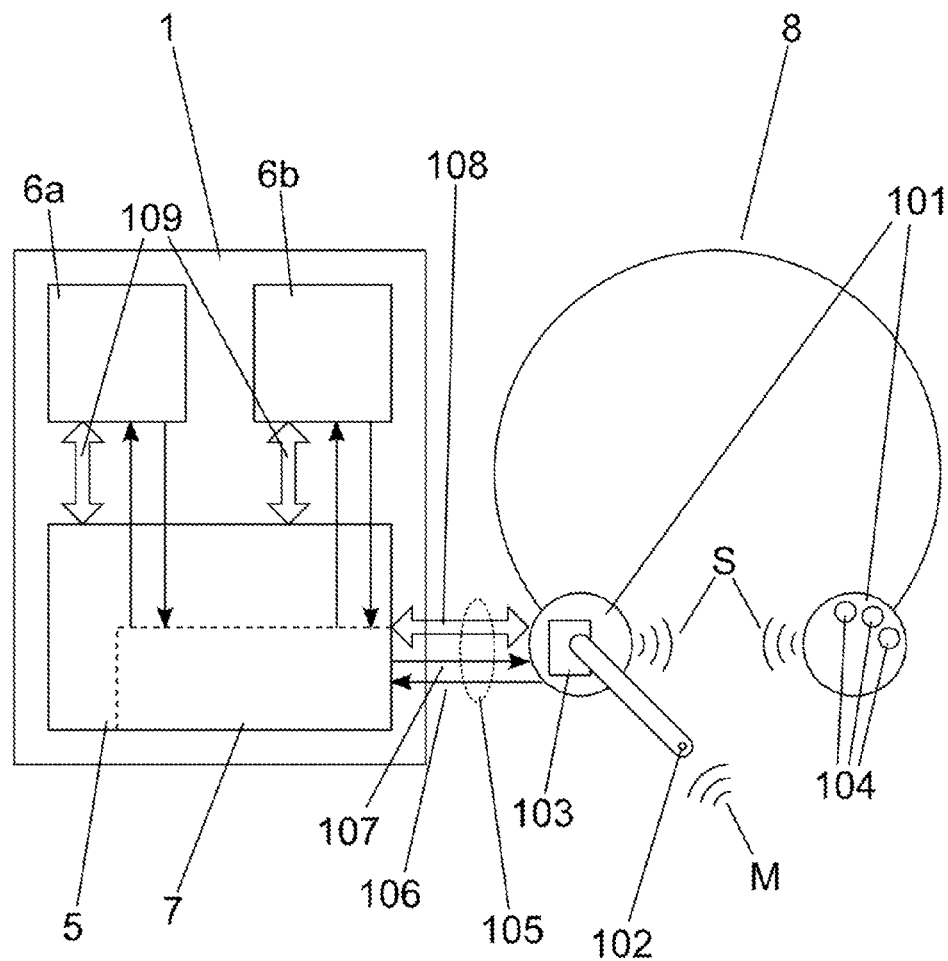
FIG. 10 shows a headset that may be used with computers and/or methods according to the invention.

FIG. 10 shows details of an audio device 8 that may be used as a sound interface device with computers 1 and/or methods according to the invention. The shown audio device 8 is embodied as a headset, which is only one example of such audio devices 8. In other embodiments, the audio device 8 may be e.g. an earphone, a handset or a speakerphone. Where, in the following, reference is made to the headset 8, any disclosed features or properties of the headset 8 may be similarly applicable to such other types of audio devices 8. The headset 8 comprises two loudspeakers 101, a microphone 102, a control unit 103 and a set of control elements 104. In some embodiments, one or both of the loudspeakers 101 may be omitted, such that the headset 8 functions as a monaural headset or as a sound input device only. In some embodiments, the microphone 102 may be omitted, such that the headset 8 functions a sound output device only. In some embodiments, the control elements 104 may be omitted. In some embodiments, the headset 8 may comprise more than two loudspeakers 101 and/or more than one microphone 102.

The headset 8 may communicate with a computer 1 through a wired or wireless connection 105 and thus exchange device audio signals 106, 107 and device control signals 108, 109 with the operating system 5 and/or one or more applications 6 executing on the computer 1. The headset 8 may e.g. be used as the headset 8i during a phone call through the softphone application 6a as shown in FIG. 2. In such a scenario, the microphone 102 functions as a sound input device that provides a device audio input signal 106 to the computer 1 in dependence on a microphone sound signal M received by the microphone 102, and the computer 1 provides the first microphone audio signal $X_m$ as described further above in dependence on the device audio input signal 106 and thus on the microphone sound signal M. Correspondingly, the computer 1 provides a device audio output signal 107 to the loudspeakers 101 in dependence on the first loudspeaker audio signal $X_s$, and the loudspeakers 101 function as respective sound output devices that each emits a loudspeaker sound signal S in dependence on the device audio output signal 107 and thus on the first loudspeaker audio signal $X_s$. Any application 6 that connects to the first logic audio device X can thus use the microphone 102 for receiving a user's voice and/or the loudspeakers 101 for providing audible signals to the user.

The control unit 103 preferably controls the provision of the device audio input signal 106 and/or the loudspeaker sound signal S in dependence on a device control signal 108 received from the computer 1 and/or in dependence on user actions detected by one or more of the control elements 104. The control unit 103 may thus e.g. allow the user to adjust levels of the device audio input signal 106 and/or the loudspeaker sound signals S as well as to mute the microphone 102 by manipulating one or more of the control elements 104 and/or the user interface 52 of the computer 1. The control unit 103 may further provide in a device control signal 108 to the computer 1 one or more control commands from a first set of control commands in dependence on user actions detected by one or more of the control elements 104. The first set of control commands preferably comprises a call-termination command and may preferably comprise further control commands, such as e.g. a call-acceptance command. The device controller 3 and/or the operating system 5 may preferably provide one or more control commands 109 to the softphone application 6a in dependence on the control commands 108 received from the headset 8 in order to forward the received control commands 108 to the softphone application 6a, which may preferably execute the forwarded commands 109 and thus e.g. accept an incoming call or terminate an ongoing call. The control unit 103 may thus allow the user to accept and terminate phone calls with the softphone application 6a by pressing respective buttons 104 or performing other actions that can be detected by one or more of the control elements 104.

Many known operating systems 5 inherently manage each audio device 8 as a composite device that can exchange device audio signals 106, 107 as well as control commands 108 with the computer 1. Such an operating system 5 typically automatically recognizes a limited set of control commands 108 and forwards recognized control commands 108, when received from an audio device 8, to the same application 6a to which the operating system 5 forwards the audio output signal 106 received from the particular audio device 8. The limited set of control commands 108 typically comprises basic audio control commands 108, such as e.g. audio level commands and/or microphone mute commands, and/or basic phone control commands 108, such as call-acceptance commands and/or call-termination commands. In the scenario of FIG. 1, the operating system 5 may e.g. automatically forward call-acceptance commands and call-termination commands received from the headset 8i through the logic audio device X to the softphone application 6a. Some operating systems 5 may broadcast call-acceptance commands and call-termination commands received from a headset 8 to all applications 6. The operating system 5 preferably provides the forwarded control commands 109 to the applications 6 through the API of the audio subsystem 6, such that the applications 6 can receive such control commands 108, 109 in a standardized way, i.e. independent of the type of the audio device 8 that provided the control commands 108. Many operating systems 5 further—and in a similar way—forward control commands 109 provided by an application 6, such as e.g. a call-notification command, to the particular audio device 8 that is connected to the particular application 6.

In computers 1 and methods according to the invention as e.g. shown in FIG. 2, the virtual crossbar switch 21 may preferably forward at least some of such control commands 108, 109 between the applications 6 and the audio devices 8 in order to ensure that the applications 6 and the audio devices 8 function as expected by the user. In a scenario with at most one audio device 8 connected to each application 6, the virtual crossbar switch 21 may achieve the forwarding of control commands 108, 109 simply by letting the control commands follow the same routes as the audio signals. In scenarios with multiple audio devices 8 connected to a single application 6, such as e.g. when the virtual crossbar switch 21 is in a trainee-supervisor configuration as illustrated in FIG. 6, such simple forwarding and/or broadcasting by the operating system 5 may, however, cause unintended side effects. As an example, the trainee and the supervisor may both be engaged in a phone call through the softphone application 6a, using respectively the headset 8i and the headset 8k. In this case, the trainee would expect to have full control over the call, while the supervisor would expect to be able to influence the call only indirectly through the trainee; if, however, any of the users, e.g. the supervisor, performs a user action that the respective headset 8i, 8k recognizes as a call-termination action, the respective headset 8i, 8k may provide a call-termination command 108 to the computer 1, and in response hereto, the operating system 5 and/or the virtual crossbar switch 21 may recognize and forward the call-termination command 108, 109 to the softphone application 6a, which therefore terminates the call independent of the user's identity.

In the trainee-supervisor configuration, the virtual crossbar switch 21 may thus preferably forward a call-termination command 108, 109 and/or other control commands 108, 109 to the softphone application 6a only if the received control command 108 originated at the trainee's headset 8i. Correspondingly, in the trainee-supervisor configuration, the virtual crossbar switch 21 may preferably ignore a call-termination command 108 and/or other control commands 108 if the control command 108 originated at the supervisor's headset 8k and thus prevent that such control commands 108 reach the softphone application 6a. Alternatively, the virtual crossbar switch 21 may react in other ways to one or more control commands 108 from the supervisor's headset 8k. The virtual crossbar switch 21 may e.g. regard the supervisor's headset 8k as unavailable after receiving a call-termination command 108 from the supervisor's headset 8k and thus rebuild the set of available sound interface configurations as described further above.

Some operating systems 5 do not allow applications, such as intermediate applications 21, to take direct control over the flow of control commands 108, 109 between applications 6 and audio devices 8. This restriction may apply to different sets of control commands 108, 109, depending on the type of operating system 5. For instance, some operating systems 5 do not allow applications to take direct control over the flow of control commands 108, 109 that belong to the standard audio control commands defined for audio signals in the USB standard. To accommodate for the case that the virtual crossbar switch 21 could be running on a computer 1 with an operating system 5 implying such restrictions, the virtual crossbar switch 21 may preferably, as an alternative and/or in addition to forwarding the control commands 108, 109, exchange one or more signal control commands (not shown) with one or more applications 6, and the application 6 may ignore received control commands 108, 109 and/or generate control commands 108, 109 in dependence on receiving such signal control commands.

In some embodiments, the virtual crossbar switch 21 may be connected to receive one or more of the control commands 108, 109 exchanged between applications 6 and audio devices 8 and may provide one or more signal control commands to an application 6 and/or an audio device 8 in dependence on the origin, the destination and/or the content of a received control commands 108, 109. In such embodiments, the virtual crossbar switch 21 may thus e.g. detect a control command 108, 109 that—in order to provide the functionality expected by the user(s)—should not be forwarded to a particular recipient 6, 8 and in response hereto provide a signal-ignore control command to the recipient 6, 8, thereby causing the recipient 6, 8 to ignore the respective control command 108, 109. Alternatively or additionally, the virtual crossbar switch 21 may e.g. detect a control command 108, 109 that—in order to provide the functionality expected by the user(s)—should be forwarded to a particular recipient 6, 8 and in response hereto provide a signal-enable control command to the recipient 6, 8, thereby causing the recipient 6, 8 to process the respective control command 108, 109 while ignoring control commands 108, 109 that are not followed by a signal-enable control command from the virtual crossbar switch 21. In some embodiments, one or more applications 6 and/or audio devices 8 may be adapted to query the virtual crossbar switch 21 for a signal control command, such as e.g. a signal-ignore control command or a signal-enable control command, in response to receiving a control command 108, 109. In such embodiments, the virtual crossbar switch 21 may be able to control the forwarding of control commands 108, 109 without receiving or monitoring the control commands 108, 109 exchanged between applications 6 and audio devices 8.

The above described indirect control of the flow of control commands 108, 109 between applications 6 and audio devices 8 may be implemented in any embodiments of the invention, in addition to or as an alternative to the direct forwarding explained in several instances within this description. In the present context, such indirect control is considered being an equivalent to the direct control.

The virtual crossbar switch 21 may preferably forward the control commands 108, 109 in dependence on the currently selected sound interface configuration. Forwarding of control commands 108, 109 may preferably be prescribed in one or more of the configuration templates 61, and the configuration controller 51 may use the configuration templates 61 as input for determining whether or not a particular control command 108 shall be forwarded, as well as in which form and/or to which recipient 6, 8 a control command 108 shall be forwarded. Thus, the virtual crossbar switch 21 may in general receive a first device control signal 108 indicating a first user action detected by a first sound interface device 8 and provide a second device control signal 109 to an application 6 in dependence on the first device control signal 108 and on the currently selected sound interface configuration. The virtual crossbar switch 21 may further delay the provisioning of the second device control signal 109 until after reception of a third device control signal 108 indicating a second user action detected by a second sound interface device 8. This allows the virtual crossbar switch 21 to e.g. suspend termination of a call until the users of both involved headsets 8 have performed a "terminate call"-action. This may e.g. be preferred when the computer 1 is used in the dual-headset conferencing configuration 61d.

The virtual crossbar switch 21 may preferably further duplicate or otherwise provide multiple device control signals 108 to multiple audio devices 8 in dependence on receiving a device control signal 109 from an application 6. In the dual-headset conference configuration, for instance, in dependence on receiving a call-notification control command 109 from the softphone application 6a indicating an incoming call, the virtual crossbar switch 21 may provide a corresponding call-notification control command 108 to each of the connected headsets 8i, 8k. Thus, the virtual crossbar switch 21 may in general receive a fourth device control signal 109 from a first application 6a and provide a fifth device control signal 108 to the first and/or the second sound interface device 8i, 8k, 8 in dependence on the fourth device control signal 109 and the selected sound interface configuration 61.

Many known operating systems 5 and/or device controllers 3 allow devices, such as e.g. audio devices 8, to register one or more device types with the computer 1, thus allowing applications 6 executing on the computer 1 to identify devices that are relevant to the particular application 6. For instance, many softphone applications 6a can connect to devices that register as an audio communication device and thus allow a user to select a sound interface device 8 only among such devices, while ignoring devices of other types, such as mice, keyboards and the like. This concept generally makes it easier for applications 6 and users of the computer 1 to use different types of devices. In the following, the device type "audio communication device" or "ACD" is used to denote one or more device types generally recognized by softphone applications 6a as suitable for use as sound interface devices 8. Conversely, the device type "non-ACD" is used to denote all other device types. The specific device types and/or the methods of registering device types with the computer 1 may vary depending on the type of computer 1 and/or the type of operating system 5. A person skilled in the art should, nonetheless, be readily able to determine which specific device types would qualify as an ACD with a specific computer 1 with a specific operating system 5. When a device registers a specific device type with the computer 1, the device controller 3 and/or the operating system 5 typically propagate that device type to the applications 6. In the case of audio devices 8, the operating system 5 may propagate the registered device types as characteristics of the primary logic audio devices X, Y, Z that represent the respective audio devices 8.

In some embodiments of the invention, the virtual crossbar switch 21 may preferably register a device type for the secondary logic audio device W that differs from a device type registered by one or more primary logic audio devices X, Y, Z that the secondary logic audio device W is connected to through the virtual crossbar switch 21. This allows the virtual crossbar switch 21 to facilitate exchange of audio signals between devices with a specific registered device type and applications 6 that do not otherwise provide for audio connection to devices with that specific registered device type. For instance, a device may register a "stealth" device type, such as a non-ACD device type, and further have an interface allowing the device to exchange audio signals with the computer 1. Correspondingly, the operating system 5 may provide a primary logic audio device X, Y, Z representing that "stealth" device. In the case that the stealth device type is a non-ACD device type, the softphone application 6a would normally not allow the user to select the stealth device as a sound interface device 8 for use in softphone calls. However, the virtual crossbar switch 21 may, e.g. by using a corresponding configuration template 61 as input, be configured to provide a secondary logic audio device W with a "standard" device type, such as an ACD device type, as well as to connect to the primary logic audio device X, Y, Z that represents the stealth device and to route audio signals between the primary logic audio device X, Y, Z and the secondary logic audio device W, such that the user can indirectly select the stealth device as a sound interface device 8 for use, e.g. in softphone calls through an application 6a, by selecting the provided secondary logic audio device W, and such that the user can subsequently use the stealth device, e.g. for softphone calls through that application 6a. The virtual crossbar switch 21 may thus provide a device type transformation for audio devices 8 connected to the computer 1.

An audio device 8 may register an standard device type with the computer 1, and the virtual crossbar switch 21 may be configured to provide a secondary logic audio device W also with a standard device type, to connect to the primary logic audio device X, Y, Z that represents the audio device 8 and to route audio signals between the primary logic audio device X, Y, Z and the secondary logic audio device W. The operating system 5 may in this case make both the primary logic audio device X, Y, Z and the secondary logic audio device W available to e.g. a softphone application 6a, such that the user may see both of these logic audio devices W, X, Y, Z as available choices as a sound interface device 8, e.g. for use in softphone calls through the application 6a. In a sense, the audio device 8 would thus appear twice in the list of available sound interface devices 8 and would thus be available both through direct selection and through indirect selection. In order to avoid confusing the user of a specific application 6, the audio device 8 may preferably register a stealth device type that is not recognized or that is filtered out by that specific application 6, and the virtual crossbar switch 21 may preferably be configured to perform the device type transformation described above. Thus, the audio device 8 will only appear once in the list of available sound interface devices 8, namely as the secondary logic audio device W, and is thus available through indirect selection only. For instance, in order to hide its respective primary logic audio device X, Y, Z from a softphone application 6a, the audio device 8 may register a non-ACD device type with the computer 1, and the virtual crossbar switch 21 may be configured to provide a secondary logic audio device W with an ACD device type as well as to connect to the non-ACD primary logic audio device X, Y, Z that represents the audio device 8 and to route audio signals between the primary logic audio device X, Y, Z and the secondary logic audio device W.

In some embodiments, a headset 8 or other audio device 8 may be adapted to register two or more different device types with the computer 1. The audio device 8 may preferably select the device type for registration in dependence on detecting a user action and/or on detecting one or more predefined control commands 108 from the computer 1. The audio device 8 may preferably default to a standard mode wherein it registers a standard device type, such as an ACD device type, with the computer 1 and may thus be available for a specific application, such as a softphone application 6a, through direct selection. The audio device 8 may preferably be able to switch to a stealth mode wherein it registers a stealth device type, such as a non-ACD device type, with the computer 1 and may thus be available for a specific application, such as a softphone application 6a, through indirect selection only. The audio device 8 may preferably invoke the stealth mode in dependence on detecting a user action, such as e.g. detecting manipulation of a control element 104 and/or detecting a predefined voice input to the microphone 102. Alternatively, or additionally, the audio device 8 may preferably invoke the stealth mode in dependence on receiving a predefined control command 108 from the computer 1. The virtual crossbar switch 21 may for instance monitor one or more computer status signals $S_o$, $S_a$ from the operating system 5 and/or the audio subsystem 7 and in response to receiving a notification from the operating system 5 indicating the connecting of an audio device 8 or another device to the computer 1, the virtual crossbar switch 21 may provide a stealth-mode command 108 to the newly connected audio device 8 or other device, which may then invoke the stealth mode in response to receiving the stealth-mode command 108. In some embodiments, the audio device 8 may invoke the stealth mode upon start-up and switch to the standard mode if a stealth-mode command 108 is not received within a predefined time period after start-up and/or after detecting a connection to a computer 1. In some embodiments, the audio device 8 may provide a stealth-inquiry command 108 to the computer 1, and the virtual crossbar switch 21 may return the stealth-mode command 108 upon receiving the stealth-inquiry command 108 through the operating system 5. When switching from standard mode to stealth mode, the audio device 8 may be required to first unregister the standard-mode device type with the computer 1 and then register the stealth-mode device type with the computer 1 in order to have the operating system change the device type of the corresponding primary logic audio device X, Y, Z.

One or more configuration templates 61 may prescribe a stealth device type, such as a non-ACD device type, for one or more device placeholders 67 in order to allow the corresponding audio device configuration(s) to be available only when a corresponding number of stealth-mode capable audio devices 8 are connected to the computer 1 and available. Prescribed device types may indicate further device properties, such as e.g. whether the audio devices 8 shall be wireless or wired, whether the audio devices 8 shall provide binaural or monaural sound S to the user and/or whether or not an audio device's microphone 102 shall be muted. Correspondingly, the configuration controller 51 may preferably determine a change of the available sound interface devices 8 when a microphone 102 of a connected audio device 8 becomes muted or unmuted.

The control unit 103 of the headset 8 may preferably comprise a USB device controller (not shown) with electronic circuits and/or program code that allow the control unit 103 to communicate as a USB device with a USB host of the computer 1. Upon being connected to a computer 1, the USB device controller preferably registers one or more USB interfaces of the class "audio" in order to be able to exchange respective audio signals 106, 107 with the USB host of the computer 1 and thus serve as an audio interface between the computer 1 and the loudspeakers 101 and/or the microphone 102 of the headset 8. The USB device controller may preferably further register one or more USB interfaces of the class "HID" in order to be able to exchange specific device control signals 108 with the USB host of the computer 1, indicating e.g. audio control commands and/or phone control commands. The USB device controller may preferably register one or more HID-class USB interfaces with parameters that allow the operating system 5 and/or one or more applications 6, in particular a softphone application 6a, to recognize the headset 8 as having a standard device type, such as an ACD device type. The latter may also apply to a stealth-mode capable headset 8 when in standard mode, while such a headset 8, when in stealth mode, instead preferably registers one or more HID-class USB interfaces with parameters that prevent the operating system 5 and/or an application 6, in particular a softphone application 6a, from recognizing the headset 8 as having a standard device type, such as an ACD device type. This may allow the virtual crossbar switch 21 to perform the device type transformation described further above.

The computer 1, the device controller 3 and the memory 4 as well as the control unit 103 are preferably implemented as digital circuits operating on digital signals, but any portions hereof may be implemented as analog circuits operating on analog signals. Where necessary, such functional units or circuits may comprise analog-to-digital and/or digital-to-analog converters. Functional blocks of digital circuits may be implemented in hardware, firmware or software, or any combination hereof. Digital circuits may perform the functions of multiple functional blocks in parallel and/or in interleaved sequence, and functional blocks may distributed in any suitable way among multiple hardware units, such as e.g. signal processors, microcontrollers and other integrated circuits. Also, the intermediate application 21 may comprise multiple modules that may be installed on the computer 1 at different times and/or be loaded and executed individually by the operating system 5.

The detailed description given herein and the specific examples indicating preferred embodiments of the invention are intended to enable a person skilled in the art to practice the invention and should thus be seen mainly as an illustration of the invention. The person skilled in the art will be able to readily contemplate further applications of the present invention as well as advantageous changes and modifications from this description without deviating from the scope of the invention. Any such changes or modifications mentioned herein are meant to be non-limiting for the scope of the invention.

The invention is not limited to the embodiments disclosed herein, and the invention may be embodied in other ways within the subject-matter defined in the following claims. As an example, features of the described embodiments may be combined arbitrarily, e.g. in order to adapt the devices according to the invention to specific requirements.

Any reference numerals and names in the claims are intended to be non-limiting for their scope.

The invention claimed is:

1. A method of operating and controlling an audio system used with a headset with a computer controlled by an operating system that provides an audio subsystem allowing multiple applications executed by the computer to exchange audio signals with multiple sound interface devices, the method comprising:
   receiving by an intermediate application a first audio output signal from a first application;
   providing by the intermediate application a first loudspeaker audio signal to the audio subsystem in dependence on the first audio output signal, thereby causing a first sound interface device to emit a first loudspeaker sound signal in dependence on the first loudspeaker audio signal;
   receiving by the intermediate application and from the audio subsystem a first microphone audio signal depending on a first microphone sound signal received by the first sound interface device;
   providing by the intermediate application a first audio input signal to the first application in dependence on the first microphone audio signal; and
   providing by the intermediate application a second loudspeaker audio signal to the audio subsystem in dependence on the first audio output signal and the first microphone audio signal, thereby causing a second sound interface device to emit a second loudspeaker sound signal in dependence on the second loudspeaker audio signal; and wherein the method further includes,
   for each of the first and the second sound interface device, determining by the intermediate application a device connection state indicating whether or not the respective sound interface device is available for exchange of audio signals through the audio subsystem;
   determining by the intermediate application a set of available sound interface configurations in dependence on the device connection states; and
   providing by the intermediate application the first loudspeaker audio signal, the first audio input signal and/or the second loudspeaker audio signal in dependence on the set of available sound interface configurations.

2. A method according to claim 1, and further comprising:
   receiving by the intermediate application and from the audio subsystem a second microphone audio signal depending on a second microphone sound signal received by the second sound interface device; and
   providing by the intermediate application the first loudspeaker audio signal in further dependence on the second microphone audio signal.

3. A method according to claim 1 and further comprising:
   providing by the intermediate application a second audio input signal to a second application in dependence on the first audio output signal and/or the first microphone audio signal.

4. A method according to claim 1, wherein each of the first and second sound interface devices comprises a headset, an earphone, a handset or a speakerphone and wherein each of the first and second sound interface devices comprises a sound output device and a sound input device.

5. A method according to claim 1, wherein the first application comprises a softphone.

6. A method according to claim 1 and further comprising:
   determining by the intermediate application a device type for each sound interface device for which the respective device connection state indicates availability for exchange of audio signals through the audio subsystem; and
   determining by the intermediate application the set of available sound interface configurations in further dependence on the device types.

7. A method according to claim 1, wherein the set of available sound interface configurations comprises two or more different sound interface configurations from the set comprising a single-headset configuration, an agent-supervisor configuration, a trainee-supervisor configuration and a dual-headset conferencing configuration.

8. A method according to claim 1 and further comprising:
   providing by the intermediate application an indication to a user of the set of available sound interface configurations;
   receiving by the intermediate application a user response signal indicating a detected user response;
   selecting by the intermediate application a sound interface configuration from the set of available sound interface configurations in dependence on the user response signal; and
   providing by the intermediate application the first loudspeaker audio signal, the first audio input signal and/or the second loudspeaker audio signal in further dependence on the selected sound interface configuration.

9. A method according to claim 8, wherein the user response is detected by the first or the second sound interface device.

10. A method according to claim 8 and further comprising:
    receiving by the intermediate application a first device control signal indicating a first user action detected by a first one of the first and the second sound interface device; and
    providing by the intermediate application a second device control signal to the first application in dependence on the first device control signal and the selected sound interface configuration.

11. A method according to claim 10 and further comprising:
    delaying by the intermediate application the provisioning of the second device control signal until after reception of a third device control signal indicating a second user action detected by the respective other one of the first and the second sound interface device.

12. A method according to claim 8 and further comprising:
   receiving by the intermediate application a fourth device control signal from the first application; and
   providing by the intermediate application a fifth device control signal to the first and/or the second sound interface device in dependence on the fourth device control signal and the selected sound interface configuration.

\* \* \* \* \*